March 4, 1941.  C. ORSINI  2,233,987
MACHINE AND METHOD FOR MAKING STRIPED PLASTIC BODIES
Filed March 17, 1938  3 Sheets-Sheet 1
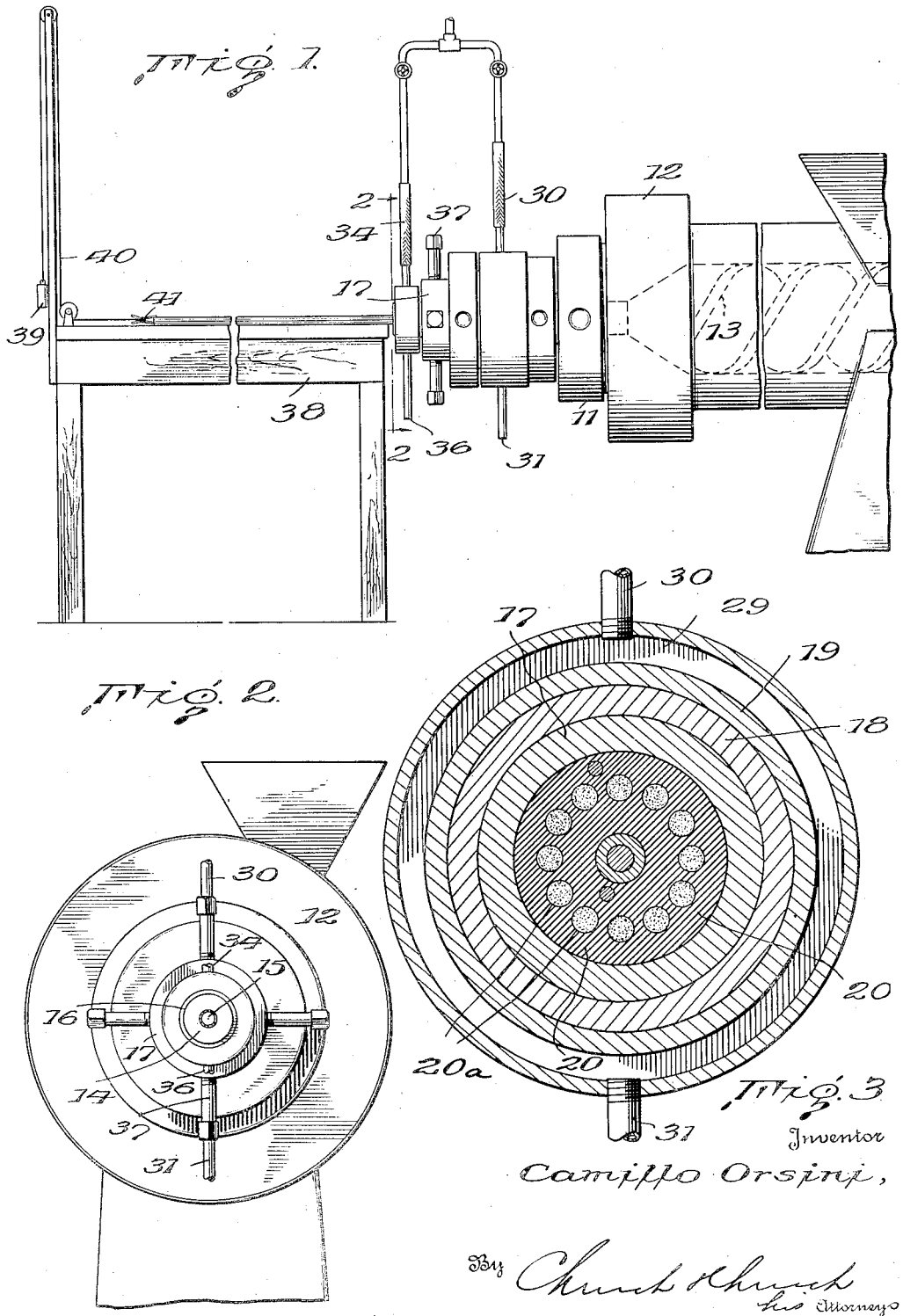
Inventor
Camillo Orsini

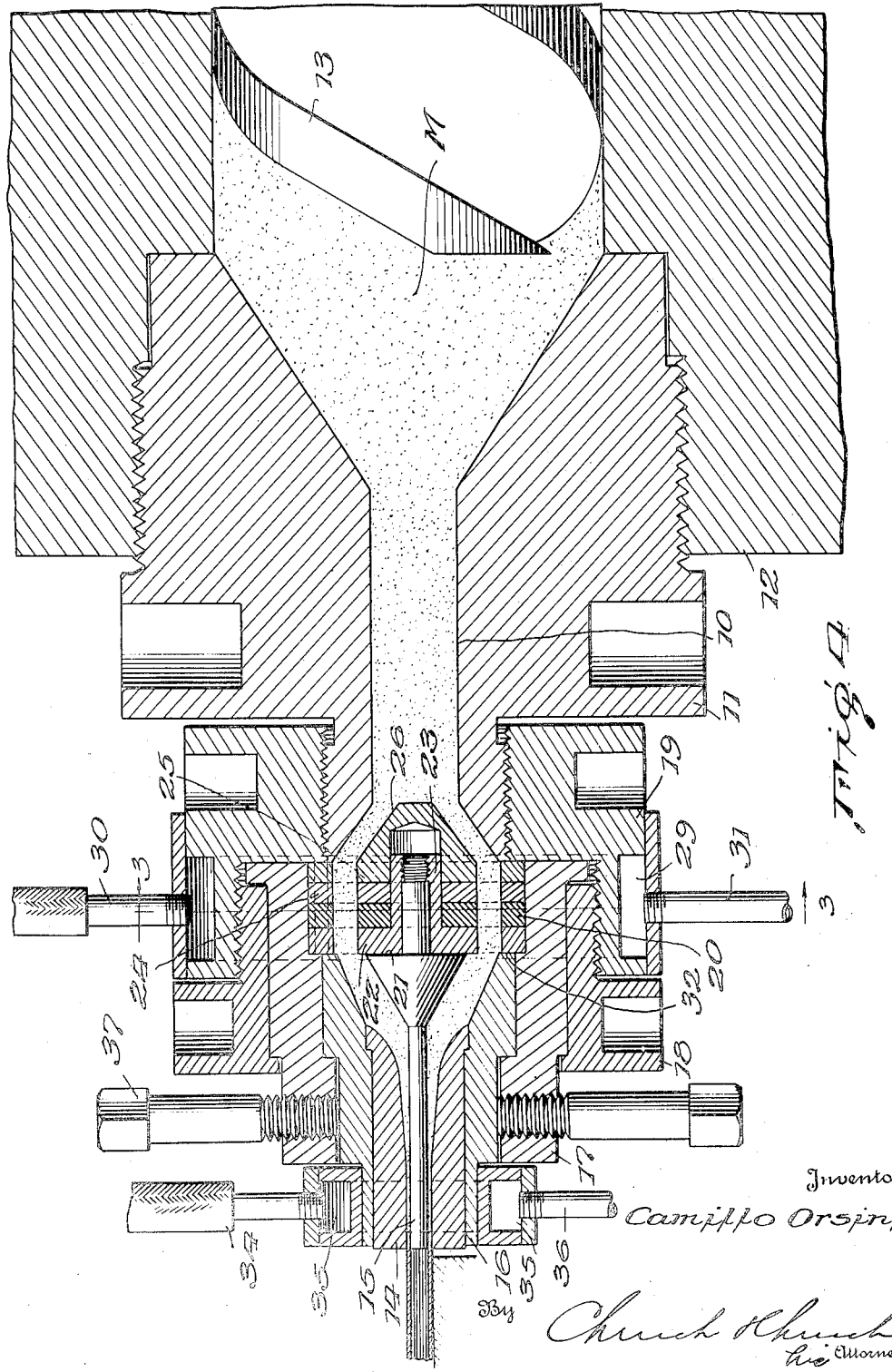

March 4, 1941. C. ORSINI 2,233,987
MACHINE AND METHOD FOR MAKING STRIPED PLASTIC BODIES
Filed March 17, 1938 3 Sheets-Sheet 3
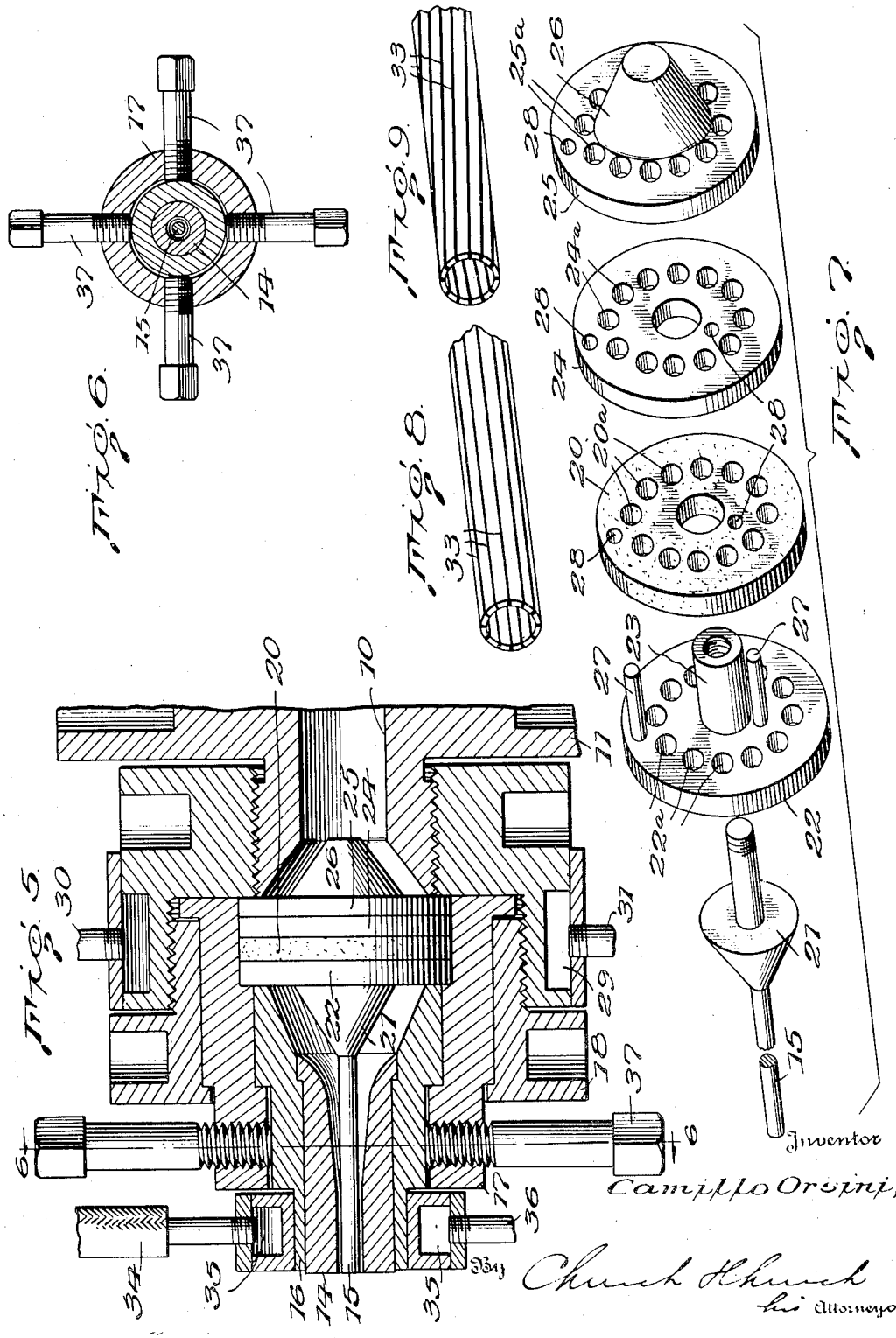
Inventor
Camillo Orsini,
his Attorneys Patented Mar. 4, 1941

2,233,987

UNITED STATES PATENT OFFICE 2,233,987

MACHINE AND METHOD FOR MAKING STRIPED PLASTIC BODIES

Camillo Orsini, Highland Park, N. J., assignor to Nixon Nitration Works, Nixon, N. J., a corporation of New Jersey Application March 17, 1938, Serial No. 196,536

7 Claims. (Cl. 18—12)

This invention relates to a method and apparatus for producing from plastic material elongated bodies, and particularly tubes such as are used in the manufacture of fountain pens and like articles, with colored stripes disposed longitudinally of the body.

The primary object of the invention is to produce bodies, preferably tubular bodies, in continuous lengths with the colored stripes extending lengthwise thereof and circumferentially spaced from each other.

Another object is to provide an apparatus and method for continuously extruding tubes formed of plastic material with the colored stripes formed therein.

A still further object is to provide means in an extruding nozzle for subdividing a body of plastic material extruded therethrough into a plurality of circumferentially spaced increments, and applying to each of said increments coloring matter and reuniting said colored increments into a unitary mass of tubular formation which is extruded in the form of a tube with longitudinally extending stripes of color spaced circumferentially of the tube.

Briefly stated, the invention may be said to consist in forcing a mass of cellulose plastic material containing a suitable solvent, such as acetone, through the nozzle of an extruding machine, with the nozzle provided on its interior with a plurality of restricted ducts which subdivide the material flowing through the nozzle into a multiplicity of smaller subdivisions or increments and the walls of which ducts are made of cured cellulosic material containing coloring matter, this latter material being soluble in the acetone or other solvent carried by the plastic mass being extruded, whereby the subdivisions formed by the ducts will have coloring matter deposited on their surfaces from the walls of the ducts. Before emerging from the nozzle, the several subdivisions are reunited and the reunited mass forced through an annular space terminating at the discharge end of the nozzle, so that the reunited mass emerges in the form of a tube with thin radially disposed thicknesses of coloring matter in the walls of the tube exposed at the exterior surface of the tube in the form of circumferentially spaced colored stripes extending longitudinally of the tube.

With these and other objects in view, the invention consists in certain details of construction and combinations and arrangements of parts, all as will hereinafter be more fully described, and the novel features thereof particularly pointed out in the appended claims.

In the accompanying drawings—

Figure 1 is an elevational view illustrating an extrusion machine comprising a nozzle constructed in accordance with the present invention;

Fig. 2 is a sectional view on the line 2—2 of Fig. 1;

Fig. 3 is a sectional view in a vertical plane taken transversely of the nozzle, the plane of the section being indicated by the line 3—3 in Fig. 4;

Fig. 4 is a longitudinal sectional view axially of the nozzle;

Fig. 5 is a similar view of the nozzle in which the coloring means and the supporting members therefor are shown in elevation;

Fig. 6 is a transverse sectional view on the line 6—6 of Fig. 5;

Fig. 7 shows in perspective the several elements of the coloring means dissociated from each other;

Fig. 8 is a perspective view of a tube of molded plastic material with the colored stripes extending in lines parallel to the axis of the tube; and Fig. 9 is a similar view in which the colored stripes are disposed spirally of the tube.

In the type of machine illustrated in the present instance, the plastic mass of cellulosic material indicated at M is forced from a chamber of comparatively large diameter into and through the reduced bore 10 at the entrance end of the nozzle which comprises a tubular member 11 in which the bore 10 is formed, said member, for instance, being threaded into a sleeve 12 secured to the cylinder containing the screw member 13 by which the plastic material is forced into and through the nozzle. As previously indicated, the present method comprises the step of forcing the plastic mass which, of course, contains a suitable solvent, such as acetone, through a passage provided with means for subdividing the stream of material into a plurality of subdivisions or rodlike increments, each of which has coloring matter applied to the surface thereof and reuniting said increments or subdivisions after being so colored, and extruding the reunited mass in the form of a cylindrical body or tube with the coloring matter appearing in the form of stripes or lines on the surface of said cylindrical body or tube. For this reason, the specific form or construction of the major portion of the extruding nozzle is more or less immaterial, the essential point being that there be means within the nozzle for so subdividing and coloring the subdivisions before they are reunited.

In the particular form of nozzle shown, the discharge end thereof is formed of a cylindrical bushing 14 having a reduced bore therein, through which the molded mass is extruded, a mandrel 15 being located within said bore for causing the material to be extruded, in the present machine, in tubular form. Bushing 14 is secured within a sleeve 16 which, in turn, is retained in a second sleeve 17, and the latter is adapted to be assembled in the nozzle by a ring 18 threaded into the interior of a second ring 19 screwed on the reduced end portion of ring 11. The several ring members 11, 18 and 19 are provided with recesses or sockets in their exterior surfaces for application of suitable tools in assembling the several parts.

The preferred structure and method for subdividing the stream of material passing through the nozzle and coloring the subdivisions consists of a disc 20 formed of cellulose stock material and coloring matter, the latter preferably constituting approximately 40% of the body of the disc, with a plurality of circularly arranged ducts 20a of reduced diameter formed in the disc to permit the passage therethrough of the plastic mass as it is forced through the nozzle. The cellulose stock in the disc is in a cured state, but is soluble in the acetone or other solvent contained in the plastic mass being molded and, as a result, the solvent in the plastic mass, as the latter is forced through the ducts in the colored disc, dissolves the stock material to release the coloring matter therefrom. As a result the coloring matter is deposited or picked up on the surface of the plastic material as the rod-like increments flow through the ducts in the disc. Also, as a consequence of this constant deposition of coloring matter, the disc 20 is gradually consumed and to compensate for reduction in cross-section of the disc and to maintain it in rigid position in the nozzle while being worn away, said disc is so arranged as to be fed and clamped against a fixed support by the action of the pressure exerted on the material being forced through the nozzle. For instance, as illustrated, particularly in Figs. 4 and 7, the inner end of mandrel 15 is enlarged to form a shoulder 21 and threaded on the inner end of said mandrel is a disc or backing plate 22 having an annular series of ducts 22a therein and an integral, elongated hub portion 23 adapted to support the disc 20. Disc 22 firmly abuts against the shoulder 21 and disc 20 is adapted to be forced against the backing disc 22 by the pressure of the material being forced through the nozzle. Preferably, disc 20 is clamped against disc 22 by additional discs 24, 25, having similarly arranged ducts 24a, 25a, respectively, these latter discs, together with disc 20, being slidably mounted on hub 23 of disc 22. The ducts in the several discs are maintained in registry with each other by alining pins 27 on disc 22 extending through openings 28 in the remaining discs. The several discs are of greater diameter than passage 10, the latter being flared as it approaches disc 25 to a diameter corresponding to the diameter of the annular series of ducts in the discs. The exposed face of disc 25 has a frusto-conical axial enlargement 26, the taper of said enlargement corresponding to the flaring of passage 10, so that said conical portion and the flared portion of the passage jointly constitute an annular passage which communicates with the ducts in the several discs. The discs 24 and 25 which, in effect, constitute a single element, are capable of sliding axially on the hub 23 of backing disc 22 under the influence of the pressure exerted on disc 25 by the plastic mass being forced through the bore 10 with the result that the disc 20 is constantly pressed against backing disc 22.

The nozzle, and particularly that portion surrounding the several discs, is adapted to be heated by a heating medium circulating through a jacket 29, said medium being supplied to said jacket through pipe 30 and discharge therefrom through pipe 31. Due to the heating effect of the medium on the disc 20, the latter, although the stock therein is cured, is more or less plastic and, while there is a tendency for the ducts 20a to be enlarged by the dissolution of the stock by the solvent, nevertheless the action of discs 24, 25, forcing the disc 20 against the backing disc 22, results in the ducts 20a remaining substantially uniform in size and in uniformly spaced relationship to each other.

The enlargement 21 on mandrel 15 is of conical formation, tapering toward the discharge end of the nozzle and, likewise, the interior surface of sleeve 16 and bushing 14 converge, so that they, together with said enlargement 21, constitute an annular tapering passage or compartment into which the material, in the form of rod-like increments, flows from the ducts in the previously described discs and from which the material is forced through the annular passage formed between bushing 14 and mandrel 15. As is more clearly shown in Fig. 4, the diameter of the several discs is such that they fit closely in the bore of ring 17 but, as will also be observed, the end of sleeve 16, which abuts against backing disc 22, has an internal diameter slightly less than the diameter of the circular series of ducts in the discs, thus forming an annular shoulder indicated at 32 which overlaps or partially closes, so to speak, the exit end of the alined ducts, the overlap being at what might be termed the radially outer portions of the ducts.

With the construction described, the plastic cellulose material is forced by screw 13 through passage 10 until it encounters the enlargement 26 on disc 25, at which point it follows the outwardly flared annular passage and passes through the openings formed by the alined restricted ducts in the several discs. As each increment passes through each individual duct in the so-called stock and coloring matter disc 20, the surface constituting the wall of the duct in said disc is dissolved by the solvent in the plastic mass so that coloring matter in said disc is liberated and deposited on the surface of the thread or increment of material passing through the duct. As the several increments or threads of material emerge from the ducts into the converging annular passage formed by enlargement 21 and the inner surfaces of sleeve 16 and bushing 14, they are reunited or brought into abutting relationship in tubular formation with the several increments arranged in substantial parallelism. In this condition they pass into the annular space between the mandrel 15 and bushing 14 and are extruded from the discharge end of the nozzle in the form of a tube as shown in Fig. 8, the coloring matter carried by the dissolved stock deposited on the several increments from the disc 20 appearing in the extruded tube at circumferentially spaced points to form longitudinally extending colored stripes such as indicated at 33 in said figure. If desired, the tube, as it emerges from the nozzle, may be twisted, under which circumstances the stripes will be arranged spirally of the tube, as illustrated in Fig. 9.

In actual practice, the extremity of the bushing at the discharge end of the nozzle, has also been heated by a heating medium supplied through a pipe 34 to jacket 35 surrounding the bushing, said jacket being provided with a discharge pipe 36. In order to adjust the bushing 14 with respect to the mandrel 15, adjusting screws 37 are threaded through ring 17 into engagement with sleeve 16 and by properly manipulating these screws the bushing can be positioned in true concentric relationship with respect to the mandrel. If desired, a supporting table 38 may be placed adjacent the discharge of the nozzle and movement of the tubing facilitated by means of a weight 39 attached to one end of a chain or other flexible member 40 disposed around pulleys, the opposite end of said member 40 being provided with means in the form of a clamp 41 for attaching it to the advance end of the extruded tube as it emerges from the nozzle.

In actual practice, each disc of stock and coloring matter has been found to be capable of supplying coloring matter to between 125 pounds and 150 pounds of the plastic cellulose material and, as will be apparent, replacements may be made of the depleted discs by simply backing the ring 18 out of the ring 19. In fact, it is preferred that the sleeve 17 be "frozen" in ring 18, so that when said ring 18 is backed out of assembled position, the several parts, including the sleeve 16, bushing 14, mandrel 15, and the several discs, will be removed as a unit whereupon, with the discs 24, 25, exposed, it is only necessary to slip them off the hub 23 of disc 22 to replace the previously depleted coloring disc. With the present construction, tubing of plastic cellulose material with colored stripes can be very expeditiously produced in the form of a continuous length of tubing and, as will be appreciated, this form of continuous production materially reduces production costs.

What I claim is:

1. The method of forming continuous lengths of plastic material having colored stripes appearing on the surface thereof which consists in incorporating a solvent in said material, forcing an increment of the material through a duct having its wall formed of a material soluble in said solvent and containing the desired coloring matter, dissolving the soluble material of the duct wall with the solvent in the plastic material to free the coloring matter and deposit the same on the plastic material, uniting a plurality of such colored increments, and extruding the united mass in a continuous length.

2. The method of forming continuous tubular bodies of plastic material having circumferentially spaced stripes appearing on the surface thereof which consists in forcing a mass of plastic material through the bore of a nozzle; subdividing said mass into a plurality of rod-like increments within said bore, depositing coloring matter on the surfaces of said increments within said bore, reuniting the colored increments in a body of tubular formation with the rod-like increments arranged in substantial parallelism with each other axially of the tubular body, and extruding said tubular body from said nozzle in a continuous length.

3. The method of forming continuous lengths of plastic material having colored stripes appearing on the surface thereof which consists in feeding a mass of plastic material containing a solvent through a passage, subdividing said material in said passage and passing the subdivisions over surfaces of soluble material carrying the desired coloring matter, dissolving said soluble material with the solvent in the plastic material to free said coloring matter and deposit the liberated coloring matter on said subdivisions, uniting said colored subdivisions in said passage, and extruding the united subdivisions from said passage in a continuous length.

4. A nozzle for extruding bodies of cellulose plastic material with colored stripes in said body, said nozzle having a passage therein through which the plastic material is forced, means in said passage for subdividing the stream of material moving therethrough, said means including means for applying coloring matter to the surfaces of the subdivided material, and means for reuniting said subdivided material prior to its discharge from the nozzle.

5. A nozzle for extruding striped bodies of cellulose plastic material containing a solvent, said nozzle having a passage therein through which the plastic material is forced, means in said passage for subdividing the stream of material moving therethrough, said means comprising a plurality of ducts through which the subdivided material passes, the walls of said ducts being formed of coloring matter carried in a material soluble in said solvent whereby said coloring matter is liberated by said solvent and deposited on the surfaces of the subdivided material as the latter passes through said ducts, and means for reuniting said subdivided material prior to its discharge from the nozzle.

6. A nozzle for extruding striped bodies from a mass of cellulose plastic material containing a solvent, said nozzle having a passage therein through which said material is forced, means for subdividing the stream of material moving therethrough comprising a disc formed of coloring matter and a material soluble in said solvent, said disc having a plurality of openings therein through which the subdivided material passes, and means for reuniting the subdivided material after it passes through said openings and prior to its discharge from the nozzle.

7. A nozzle for extruding striped tubular bodies of cellulose plastic material containing a solvent, said nozzle having a passage therein through which the material is forced, means for subdividing the stream of material moving therethrough, said means comprising a disc of coloring matter and a material soluble in said solvent and having openings therein through which the subdivided material passes, a backing member for said disc having openings therein in registry with said disc openings, and a support for said disc and backing member, said disc being loose on said support and movable toward its backing member by pressure exerted thereon by the plastic material, and means for reuniting the subdivided material prior to its discharge from the nozzle.

CAMILLO ORSINI.